United States Patent [19]

Hwang et al.

[11] Patent Number: 5,534,366

[45] Date of Patent: Jul. 9, 1996

[54] MODULAR BATTERY PACK

[75] Inventors: B. Chester Hwang, Alpharetta; Jose M. Fernandez, Lawrenceville; Vernon Meadows, Lilburn; Simon Thomas, Lawrenceville; Willard F. Amero, Jr., Flowery Branch, all of Ga.

[73] Assignee: Motorola, Inc., Schaumburg, Ill.

[21] Appl. No.: 561,736

[22] Filed: Nov. 22, 1995

[51] Int. Cl.⁶ ................................................. H01M 2/10
[52] U.S. Cl. .......................... 429/91; 429/99; 429/123; 429/100
[58] Field of Search .................... 429/90, 91, 92, 429/98, 99, 100, 121, 122, 123

[56] References Cited

U.S. PATENT DOCUMENTS 5,180,644   1/1993   Bresin et al. ........................... 429/98
5,466,545  11/1995   Chamberlain et al. .................. 429/99

*Primary Examiner*—Anthony Skapars
*Attorney, Agent, or Firm*—Scott M. Garrett; Kenneth M. Massaroni

[57] ABSTRACT

A modular battery pack (10) is described having several embodiments. In general, the modular battery pack has a battery cell cartridge (12), a circuit cartridge (14), and a housing (16). In conventional battery packs these three elements are combined into one single unit. The invention modularizes these components such that portions may be reused and shared. This results in a more cost effective power system for a portable electrical or electronic device (40) since, once the battery cell or cells (48) have expired, they can be replaced without having to replace the other components, in particular the circuitry.

9 Claims, 5 Drawing Sheets

MODULAR BATTERY PACK

TECHNICAL FIELD

This invention relates in general to battery packs, and in particular to battery packs having electrical and electronic circuit elements.

BACKGROUND

A great number of electrical and electronic devices are made in portable configurations. Many devices, such as cellular phones, for example, have gained widespread market acceptance. Indeed many personal as well as business tasks are performed with cellular phones, portable computers, personal digital assistants, and similar devices. The convenience afforded by this portability has significantly increased the speed at which business is conducted. For example, business travelers may now engage in conference calls, receive and reply to correspondence, and perform database searches while traveling. These are functions which were previously performed exclusively from an office.

To enable portability of a given device, a suitable and equally portable power source must be developed. Batteries and battery packs are typically used to fulfill this need. The two main factors to be determined in selecting an appropriate battery design are how much power must be provided, and for how long. These factors determine the resulting size of the energy source and type of electrochemical system used. Often the size of a battery pack for a given device is substantial, and may rival the size and weight of the device itself. Accordingly, there is an effort in the industry to reduce the size of battery systems. To accomplish this goal, designers have adopted a system approach.

In general there are three areas being addressed in portable systems to reduce battery or battery pack size. The first area is in reducing the power demand of the device. This is achieved, in part, by increasing the efficiency of it's circuitry. The second area is in increasing the energy density of electrochemical systems used to make batteries and battery packs, and developing new systems with much higher energy densities compared to conventional systems. New systems are being developed which provide much more capacity than conventional systems such as nickel cadmium, lithium ion being the most recent example. The third area is in optimizing the use of battery power. This has come be known as "smart battery" technology.

The term "smart battery" generally refers to a battery pack having some electronic circuitry which facilitates more efficient use of the stored energy. For example, many circuits have been developed which provide a state of charge or "fuel gauge" indication for the device. The user of a portable computer, for example, can configure the computer to sacrifice speed of operation for efficiency of operation. Circuitry is sometimes necessary when selecting more energy dense electrochemical systems, such as lithium ion, to ensure reliable operation under a variety of conditions. Circuits have been developed which shield the battery cells from stressful electrical events, and help prolong and enhance performance. As one would expect, the addition of electronics to a battery pack increases the cost of the battery pack. In view of the fact that these circuits add value in terms of operation and safety, many consumers have readily agreed to pay for the additional cost.

Still, some consumers may find the additional cost in the battery pack prohibitive. If possible, it would be a market advantage to reduce the cost of a smart battery pack to the consumer, while still providing the appropriate battery electronics. In order to achieve this, however, it is not enough to simply find less expensive components. A fundamental change of perspective is required.

In manufacturing battery packs having electronic circuits, the circuit is formed as an integral part of the battery pack. The circuit is placed permanently inside each battery pack. However, the battery cells in the pack have a finite and relatively short life span. Typically, rechargeable battery cells last about 2 years with moderate usage. When the battery cells are no longer useful, the entire battery pack is disposed of, including the circuit. However, electronic circuits have a much longer life than battery cells. Further, most users buy more than one battery pack, which means they buy the same circuitry twice. Therefore, there is a need for reducing the cost of a battery pack with a means by which an electronic battery circuit can be re-used, and shared, thus eliminating the need to re-purchase circuitry.

DETAILED DESCRIPTION OF THE PREFERRED EMBODIMENT

Figure 1:
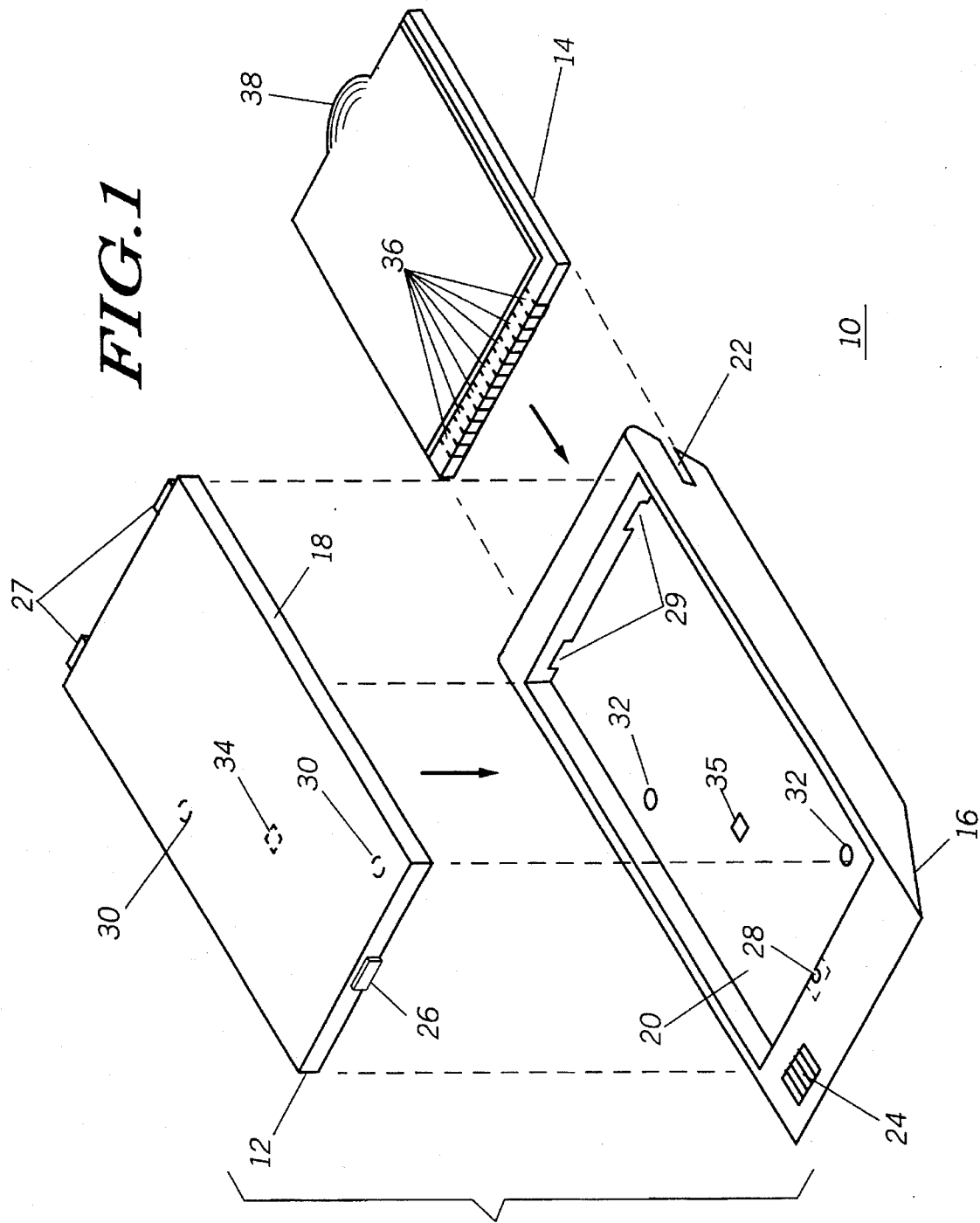
FIG. 1 is an exploded perspective view of the components of a modular battery pack in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a perspective view of the components of a modular battery pack 10 in accordance with the invention. There is shown a battery cell cartridge 12, a circuit cartridge 14, and a housing 16. The battery cell cartridge comprises a casing 18, and has at least one battery cell disposed therein. If the battery cells employ certain electrochemical systems such as, for example, lithium ion, then the battery cell cartridge should include a protection circuit for performance considerations. The protection circuit limits the electrical stress that may be applied to the battery cell or cells. Conventional systems such as nickel cadmium and nickel metal hydride, for example, do not require such a protection circuit. In fact, for systems like these that are not as sensitive to performance degradation, the battery cell cartridge may be a battery cell. The housing 16 has a first pocket 20, a means for receiving the circuit cartridge such as a second pocket or receiving slot 22, and at least two battery contacts 24. The circuit cartridge 14 comprises a battery circuit for interfacing the battery cell cartridge with a housing circuit in the housing 16.

In general, the battery cell cartridge 12 is insertable into the first pocket 20 of the housing 16. Preferably there are latching features, such as a cantilevered latch 26 and positioning tabs 27, formed on the casing of the battery cell cartridge which correspond to features such as ledge 28 and slots 29, respectively, in the first pocket. These features allow the battery cell cartridge to be latched into the housing. Alternatively, it is contemplated that the battery cell cartridge may be slideably engaged with the housing. The battery cell cartridge has at least two battery cell contacts 30 (shown in phantom) which correspond with terminals in the first pocket of the housing, such as contact springs 32. When the battery cell cartridge is latched into the first pocket, the battery cell contacts 30 engage contact springs 32, thereby electrically interconnecting the housing with the battery cell cartridge. There is preferably an access port 34 (shown in phantom) which corresponds with a temperature sensing element 35 located in the first pocket. The temperature sensing element 35 is used while recharging the battery cell or cells, and is typically a thermistor. The use of thermistors for recharging batteries is common practice.

The circuit cartridge 14 comprises a set of connectors such as circuit contacts 36 which correspond to contacts or terminals in the second pocket 22 of the housing 16. The circuit cartridge contains the battery circuit. An example of a circuit cartridge used in other fields is one conforming to the Personal Computer Memory Card International Association (PCMCIA) specification, which has become quite popular in the portable computer market. The circuit cartridge described here could take this form. In general, the battery circuit contained in the cartridge may perform a variety of functions, many of which are well known. Examples include state of charge measuring or fuel gauge circuits, charge controller circuits, regulator circuits, and safety circuits. An electronic memory means such as an EEPROM will likely be included for storing battery information, as is now increasingly common in the art. In one embodiment of the invention, the circuit cartridge includes a finger grip 38 for facilitating removal of the circuit cartridge from the housing.

Figure 2:
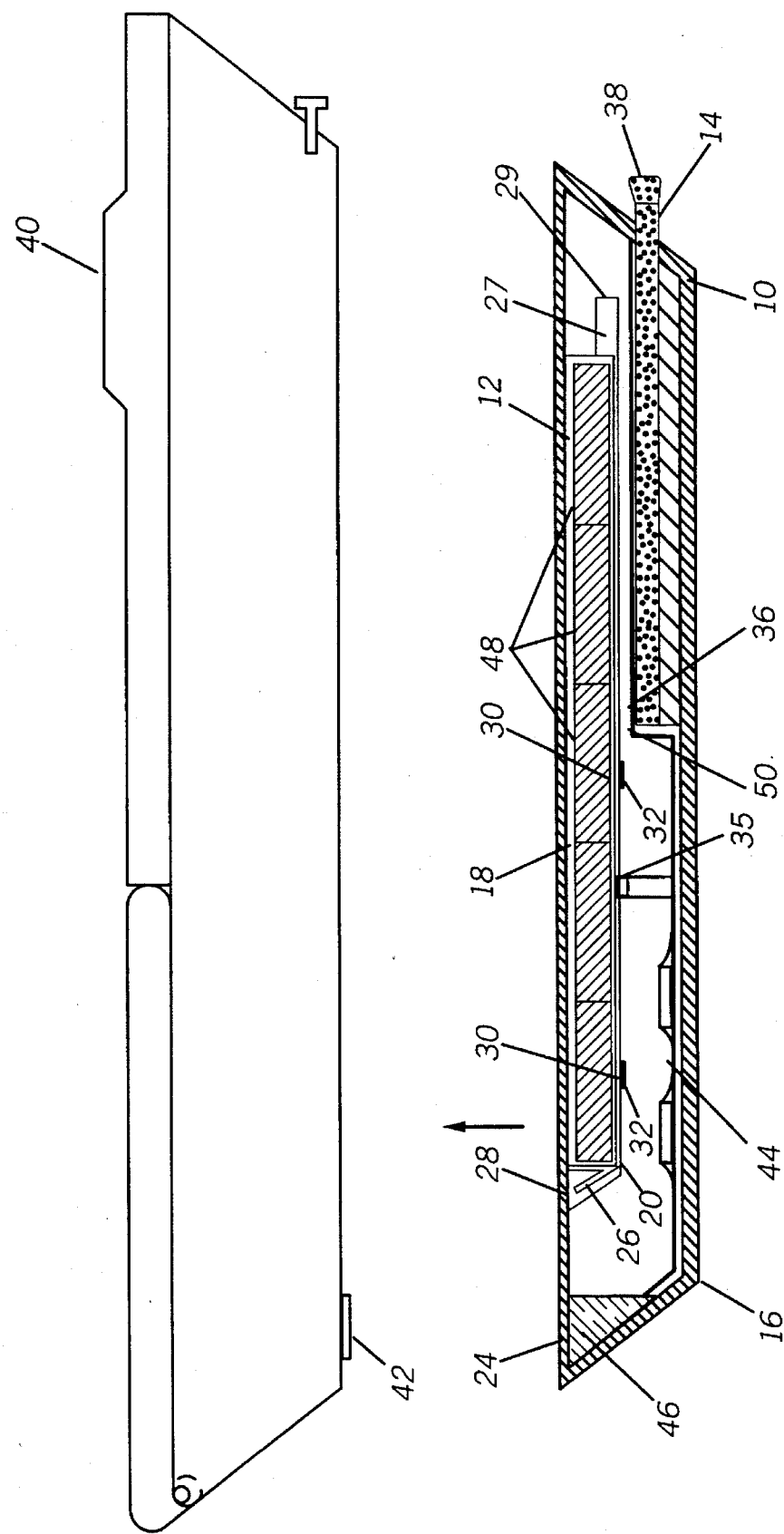
FIG. 2 is a cut-away side view of a modular battery pack in accordance with the invention wherein the components are assembled together.

An appreciation of how the housing, battery cell cartridge, and circuit cartridge function together may be obtained by a perusal of FIG. 2. Referring now to FIG. 2, there is illustrated therein a cut-away side view of a modular battery pack in accordance with the invention, such as that shown in FIG. 1, wherein the components are assembled together. Shown receiving the modular battery pack is an electrical device 40, which could be, for example, a cellular phone, portable computer, or a personal digital assistant. The modular battery pack fits onto, or slides into, the electronic device. Electrical contact is achieved when battery contacts 24 on the modular battery engage corresponding device contacts 42. Power is delivered through this interconnection, and other electrical interconnections are typically made in addition to the power connections. For example, one connection would allow the device to access an electronic memory means in the modular battery. Another may be used by the device to receive state of charge information.

From this view one can see how the battery cell cartridge 12 fits into the housing 16. Cantilevered latch 26 and positioning tabs 27 correspond with a ledge 28 and at least two slots 29 respectively in the first pocket 20 of the housing. In general, the casing is preferably fabricated from plastic so that the cantilevered latch is resilient. There are numerous latching systems for use with battery components. However, for simplicity, the preferred latching means is composed of a pair of positioning tabs 27 that extend from the back of the battery cell cartridge casing which fit into corresponding slots 29 in the pocket. On the front end of the battery cell cartridge is a cantilevered latch 26 which extends upwards and away from the bottom of the casing. The cantilevered latch is deflected by the ledge 28 when the battery cell cartridge is pushed into the pocket 20. When the battery cell cartridge is fully seated in the pocket, the cantilevered latch is beneath, and extends under the ledge, thereby latching the battery cell cartridge into the pocket. To remove the battery cell cartridge, the cantilevered latch is deflected toward the casing.

Once the battery cell cartridge is latched in place, electrical contact is made by a first set of terminals, such as contact springs 32, bearing against battery cell contacts 30 on the battery cell cartridge. The contact springs 32 are electrically connected to a housing circuit 44, which is in turn electrically connected to a contact block 46, which supports the battery contacts 24. The housing circuit interfaces the modular battery pack with the electrical device 40. In one embodiment, the circuit cartridge 14 interfaces the battery cell cartridge to the housing circuit. As electrical current enters the housing from the battery cell or cells 48, it goes to the circuit cartridge. The circuit contained in the circuit cartridge performs any of numerous functions, as previously described. Under certain conditions, the circuit cartridge may block the flow of current altogether. The circuit cartridge interfaces with the housing circuit by a set of circuit contacts 36 which correspond to circuit receiving contacts 50 in the second pocket or receiving slot 22.

In another embodiment the housing is designed to accept only the battery cell cartridge, and not the circuit cartridge. Accordingly, the receiving slot 22 would not be present. The circuit of the circuit cartridge may be incorporated into the housing circuit 44. This eliminates some flexibility of the modular battery system, but at the same time simplifies it. In such an embodiment, the housing circuit may simply be a set of conductors connecting the first set of terminals in the first pocket 20 with the contact block 46 for use by a charger, or charge control circuit. The temperature sensing element 35 would be directly connected to the contact block. Alternatively, the housing circuit may be comprised of a charger control circuit, a safety circuit, or any combination of well known battery circuits. What circuitry would be appropriate to include is left as a design choice.

Figure 3:
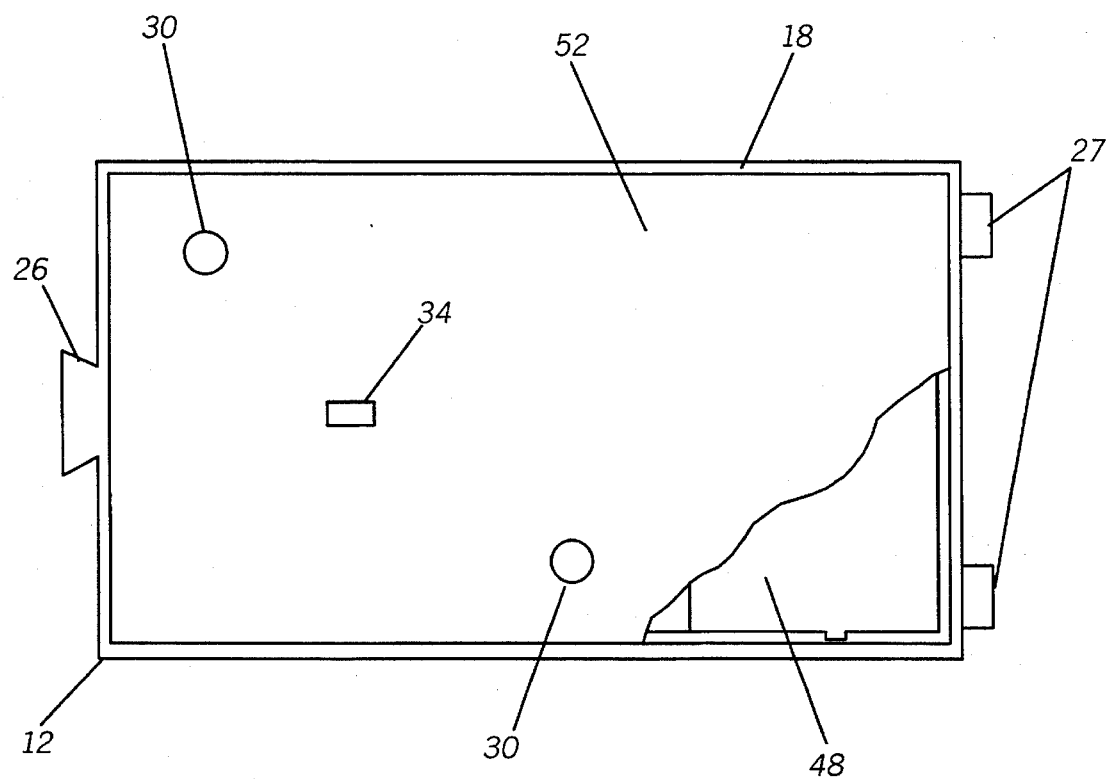
FIG. 3 is bottom plan view of a battery cell cartridge for use with a modular battery pack in accordance with the invention.

The embodiments discussed so far have included the battery cell cartridge 12. To fully appreciate the construction of the battery cell cartridge, FIG. 3 shows a bottom plan view of a battery cartridge in accordance with one embodiment of the invention. Referring now to FIG. 3, there is shown therein a battery cell cartridge 12 having a casing 18 and a cover 52. The casing comprises structure for latching the battery cell cartridge into a housing, including a cantilevered latch 26 and positioning tabs 27. It is preferred that the casing be fabricated of plastic so that the cantilevered latch is deflectable.

The cover may be formed of the same material as the casing, but it is preferred that it is a thin plastic material that can be adhesively bonded to the battery cell or cells 48 (visible here through a cut-away portion of the cover). This helps keep the battery cell cartridge thin, and the common process of ultra-sonically welding the cover to the casing is eliminated. The cover has openings formed through it to form battery cell contacts 30 and to receive a temperature sensing element at access port 34. The contacts should not be located in proximity to each other so as to reduce the risk of shorting the contacts together. It is preferred that the contacts be spaced at least one inch, and more preferably about three inches apart.

Figure 4:
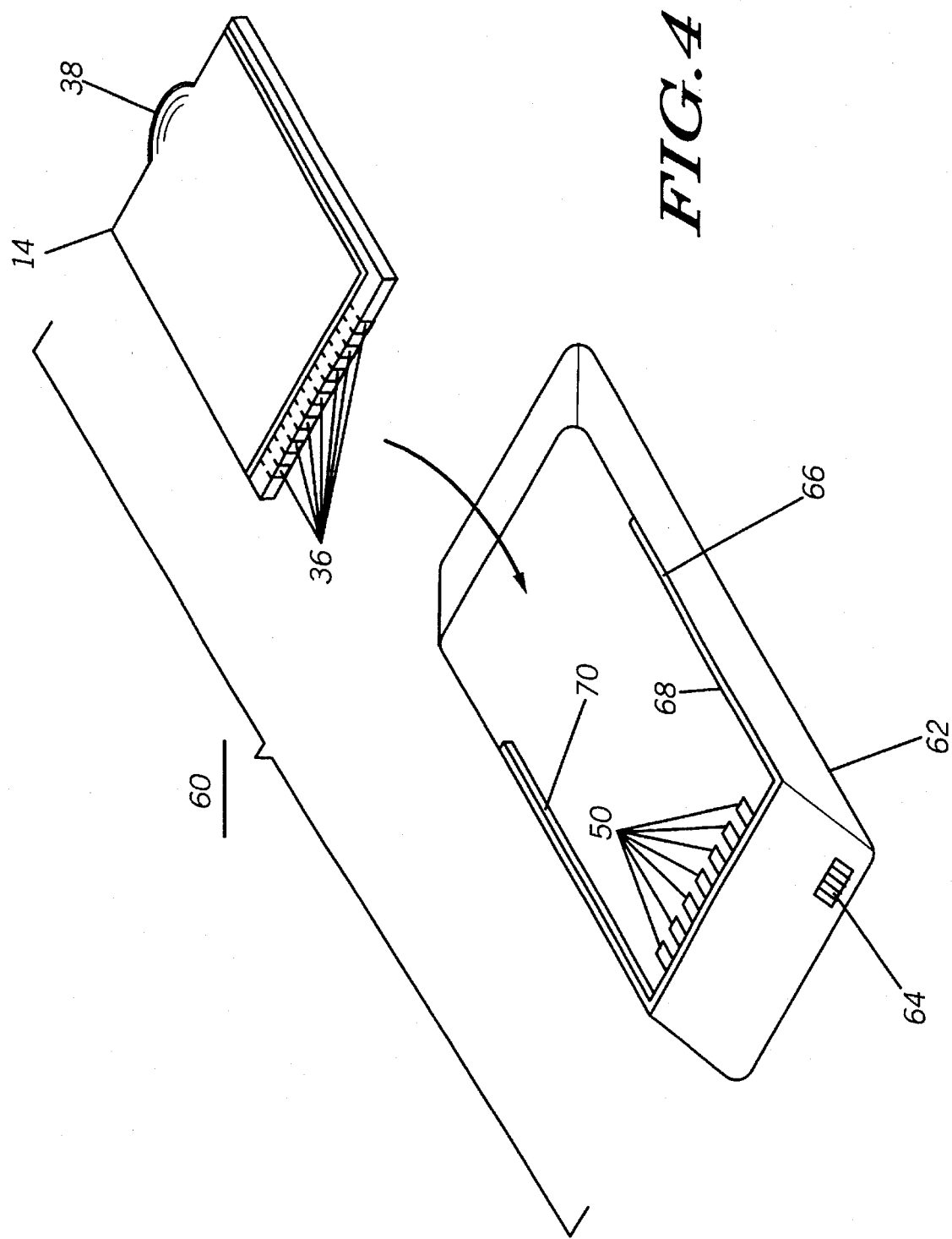
FIG. 4 is a perspective view of a battery pack system in accordance with the invention.

As described above in reference to FIG. 1 and FIG. 2, where it was discussed that the circuit cartridge could be eliminated by incorporating the circuitry into the housing, it is also similarly contemplated that, as shown in FIG. 4, the battery cell cartridge may be eliminated. Referring now to FIG. 4, there is illustrated therein a perspective view of a battery pack system 60 in accordance with one embodiment of the invention. As before there is a circuit cartridge 14 which comprises an electrical circuit. Here, however, all of the battery circuitry is disposed in the circuit cartridge.

In this embodiment, the housing 62 comprises the battery cell or cells. The only other electrical components disposed in the housing are conductors to carry current and signals to an electrical device and to the circuit cartridge. The entire burden of controlling and measuring current through the battery cells, both from a charger and to a device to be powered, rests on the circuitry in the circuit cartridge.

It is contemplated that in this type of system, the charger could be merely a power supply having a power output and a control signal input. When the battery pack system is connected to such a charger, by means of a charger contact set 64 for example, the circuit cartridge controls the charging by sending a feedback signal to the charger. This allows for a simple inexpensive charger, and again, the consumer benefits economically. Since many chargers are designed to provide a variety of charge regimes, the consumer is typically forced to pay for all of those regimes, even if only one type of battery pack is used by that particular consumer. Here, the invention shows a way where the charge regime is controlled by the circuit cartridge. If another type of regime is necessary, for example if a second type of battery is purchased, then an additional circuit cartridge having the appropriate regime would also be purchased for it.

To accomodate the circuit cartridge, the housing comprises a means for receiving the circuit cartridge such as either a receiving slot as in FIG. 1, or a rail 66. Other arrangements are contemplated, for example, providing a latching system where the circuit cartridge snaps onto the back of the housing. In the slide rail embodiment, the circuit cartridge is slid onto the back of the housing until circuit contacts 36 on the circuit cartridge make contact with circuit receiving contacts 50 on the housing. Rails are used in numerous application, including attaching battery packs to devices such as cellular phones. In general, the rail is comprised of a first wall section extending from the back of the housing, and a second wall portion that extends from the top of the first wall portion at a right angle towards the center of the housing. This provides a ledge under which a portion of the circuit cartridge is held. The rail 66 is formed from at least two opposing slide rails 68 and 70, so that the circuit cartridge is held firmly.

Figure 5:
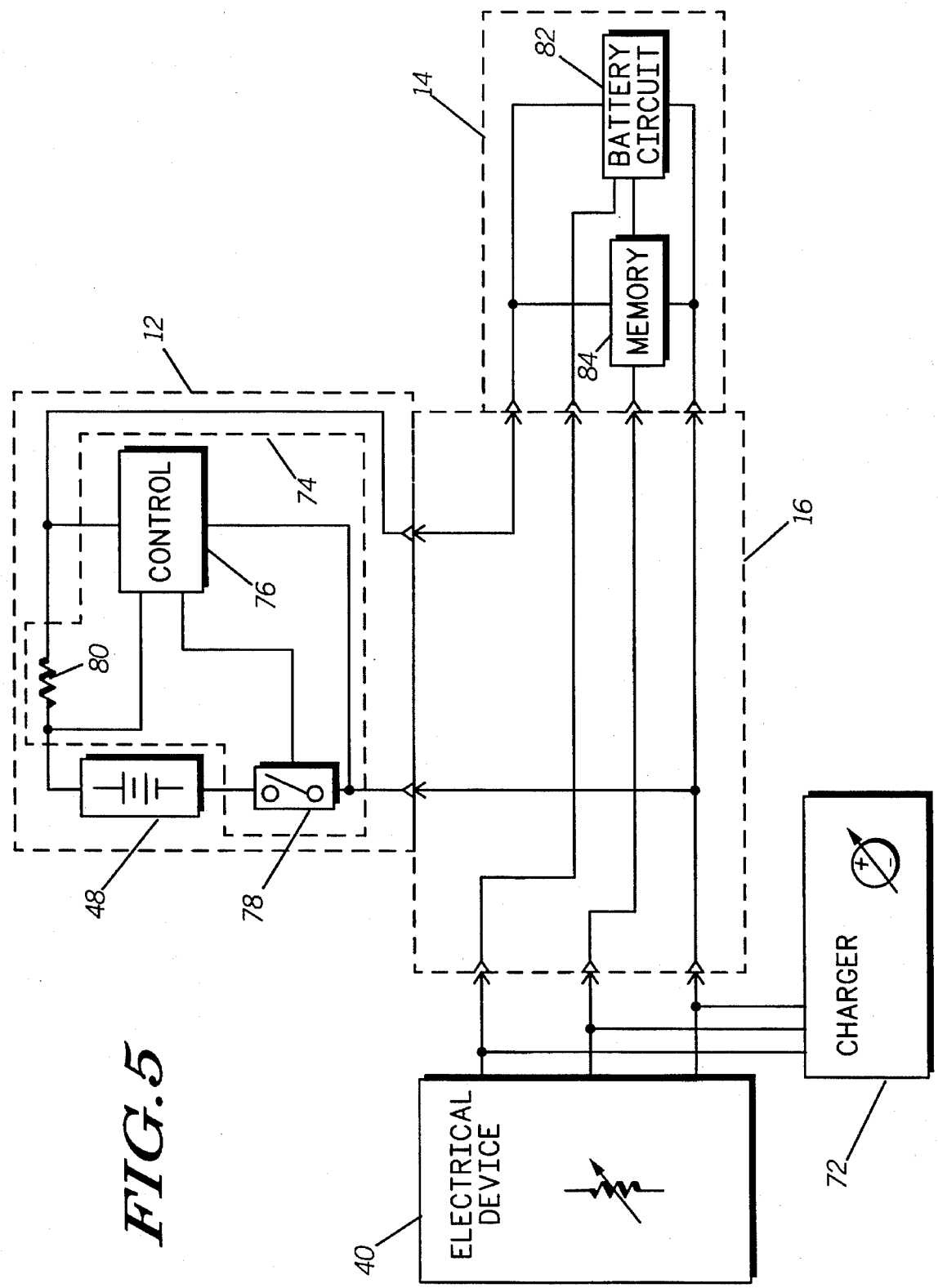
FIG. 5 is a block diagram of an electrical schematic of a modular battery pack in accordance with the invention.

To illustrate how the modular battery pack functions electrically, FIG. 5 illustrates a block diagram of an electrical schematic of a modular battery pack in accordance with the invention wherein elements previously described are shown as their electrical equivalents having the same reference numerals. Referring now to FIG. 5, there is shown the electrical equivalent of a battery cell cartridge 12, a circuit cartridge 14, and a housing 16. In addition to the modular battery pack, an electrical device 40, and a charger 72 are also shown. The battery cell cartridge comprises at least one battery cell 48. If the battery cell(s) are of the lithium ion type, a protection circuit 74 is also included for performance considerations. The protection circuit comprises a control circuit 76 and a switch 78, and possibly a means for sensing current, such as sense resistance 80. The protection circuit senses the voltage across the battery cell(s) and opens the switch 78 if either the voltage rises above a predetermined upper voltage threshold, or if it drops below a predetermined lower voltage threshold. In addition, the control circuit will open the switch if the current level through the battery cell or cells exceeds a predetermined current threshold level.

The circuit cartridge comprises a battery circuit 82, which performs any of numerous known functions. Examples of such battery circuit functions include measuring the state of charge of the battery cell or cells, regulating the voltage and/or current through the cells, and performing charge control. Circuits for all of theses functions are currently being produced in numerous variations. Indeed, there is an industry producing battery electronic components for such battery circuits. The circuit cartridge could also provide an electronic memory means 84 for storing battery information. Examples of the type of information stored would includes cycles, time of last recharge, type of electrochemical system used, maximum voltage level, maximum current level, maximum temperature level, to name but a few. There are numerous battery products that are sold with such memory devices, and several companies have published battery information standards, although none have yet dominated the marketplace.

The electrical interconnections between the various components accomplished by the use of standard conductors, such as wires, but more preferably, flexible circuit boards. Flexible circuit boards are used in many applications, including battery packs and facilitate assembly while minimally impacting cost. The electrical connection between the circuit of the battery circuit cartridge and the housing circuit is made by engaging the battery cell contacts 30 and contact springs 32. The electrical interconnection between the battery circuit of the circuit cartridge and the housing circuit is made by engaging the circuit contacts 36 and the circuit receiving contacts 50. Finally, the electrical connection between the modular battery pack and the electrical device and the charger is made by battery contacts and device contacts 42. In at least one embodiment, the contact block shown in FIG. 2 supports separate contacts for both the device 40 and the charger 72.

It should be appreciated, as previously mentioned, that while the modular battery pack is shown here as three components, either the battery cell cartridge 12 or the circuit cartridge 14 could be incorporated into the housing 16, and still provide the necessary modularization of the invention. The purpose of the invention is not to provide new battery circuits, but rather to modularize the functions of existing battery packs, and battery packs yet to come. In this way the consumer receives an economic benefit by being able to re-use necessary circuitry. When the battery cell or cells of the battery cell cartridge have reached the end of their useful life, only that portion of the modular battery pack need be replaced. The consumer does not need to pay for the cost of new battery circuitry simply because the battery cell(s) expired. In addition, if the user has more than one battery cell cartridge, he or she will typically use only one at a time, and by modularizing the battery pack, again, only one set of battery circuits is necessary. Thus, while the initial cost of buying a modular battery pack may be higher, the replacement cost of new battery cells is significantly lower than they way they are typically marketed.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A modular battery pack for powering an electrical device, comprising:

a battery cell cartridge having at least one battery cell disposed therein;

a circuit cartridge; and a housing having a first pocket for receiving said battery cell cartridge and a second pocket for receiving said circuit cartridge, and a housing circuit for interfacing said modular battery pack with said electrical device.

2. A modular battery pack as defined by claim 1, wherein said battery cell cartridge comprises:

a casing for holding said at least one battery cell; and latching features disposed on said casing for latching said battery cell cartridge into said first pocket of said housing.

3. A modular battery pack as defined by claim 2, wherein said battery cell cartridge comprises a protection circuit connected to said at least one battery cell.

4. A modular battery pack as defined by claim 1, wherein said circuit cartridge is a removable circuit cartridge and comprises a battery circuit for interfacing said battery cell cartridge with said housing circuit.

5. A modular battery pack as defined by claim 4, wherein said battery circuit comprises an electronic memory means for storing battery information.

6. A modular battery pack as defined by claim 4, wherein said at least one battery cell has a state of charge, said battery circuit measures said state of charge.

7. A modular battery pack for powering an electrical device, comprising:

a housing having a first pocket, a second pocket, and a housing circuit for interfacing said modular battery pack with said electrical device, latching features disposed in said first pocket;

a battery cell cartridge, at least one battery cell disposed therein, a casing for holding said at least one battery cell, and latching features disposed on said casing, corresponding with said latching features disposed in said first pocket, for latching said battery cell cartridge into said first pocket; and a circuit cartridge having a battery circuit for interfacing said battery cell cartridge with said housing circuit.

8. A modular battery pack as defined by claim 7, wherein said battery cell cartridge comprises a protection circuit connected to said at least one battery cell.

9. A modular battery pack as defined by claim 7, wherein said battery circuit comprises an electronic memory means for storing battery information.

* * * * *